United States Patent
Leng

(10) Patent No.: US 8,438,258 B2
(45) Date of Patent: May 7, 2013

(54) DATA UPDATE FOR WEBSITE USERS BASED ON PRESET CONDITIONS

(75) Inventor: Shanshu Leng, Hangzhou (CN)

(73) Assignee: Alibaba Group Holding Limited, Cayman Islands (KY)

( * ) Notice: Subject to any disclaimer, the term of this patent is extended or adjusted under 35 U.S.C. 154(b) by 59 days.

(21) Appl. No.: 12/807,277

(22) Filed: Aug. 31, 2010

(65) Prior Publication Data

US 2011/0093578 A1    Apr. 21, 2011

(30) Foreign Application Priority Data

Oct. 16, 2009  (CN) .......................... 2009 1 0178321

(51) Int. Cl.
*G06F 15/173* (2006.01)
(52) U.S. Cl.
USPC .......................... 709/223; 709/224; 709/225
(58) Field of Classification Search .................. 709/223, 709/224, 225
See application file for complete search history.

(56) References Cited

U.S. PATENT DOCUMENTS

| | | | |
|---|---|---|---|
| 5,832,481 A | 11/1998 | Sheffield | |
| 6,675,197 B1 * | 1/2004 | Satoh et al. | 709/204 |
| 6,745,180 B2 | 6/2004 | Yamanoue | |
| 7,584,120 B1 | 9/2009 | Yun et al. | |
| 2004/0030674 A1 | 2/2004 | Nagano et al. | |
| 2007/0032240 A1 | 2/2007 | Finnegan et al. | |
| 2008/0086558 A1 | 4/2008 | Bahadori et al. | |
| 2010/0125505 A1 | 5/2010 | Puttaswamy | |

FOREIGN PATENT DOCUMENTS

CN    101159764    4/2008

OTHER PUBLICATIONS

Shi, Dongxia, "Research and Improvement in Web Application for Ajax Technology", Chinese Master's Thesis Full Text Database: Information Science and Technology, Feb. 15, 2009.

* cited by examiner

*Primary Examiner* — Adnan Mirza
(74) *Attorney, Agent, or Firm* — Van Pelt, Yi & James LLP

(57) ABSTRACT

Updating user data on a website includes: authenticating a user who is accessing the website via a client; determining whether an operation behavior of the user satisfies a first preset condition; in the event that the first preset condition is satisfied, obtaining user identification information, including a user identifier (ID); determining whether a stored user property that corresponds to the user ID satisfies a second preset condition; and in the event that the second preset condition is satisfied, updating designated service related data of the user.

15 Claims, 3 Drawing Sheets

DATA UPDATE FOR WEBSITE USERS BASED ON PRESET CONDITIONS

CROSS REFERENCE TO OTHER APPLICATIONS

This application claims priority to People's Republic of China Patent Application No. 200910178321.X entitled DATA UPDATE METHOD, APPARATUS AND SYSTEM filed Oct. 16, 2009 which is incorporated herein by reference for all purposes.

FIELD OF THE INVENTION

The present application relates to Internet technologies and, particularly, to data updates for website users.

BACKGROUND OF THE INVENTION

Many Internet services involve the storage and update of user data. The ability to accurately determine when and how to store and update the user data is important for improving the performance of the website service.

In existing Internet service platforms, when a user accesses a website, the user data is typically updated in one of the following ways:

1) stop-and-wait. When a user accesses a web page, web server code associated with the web page is executed step by step to identify the identity of the user, obtain service data, organize and present the user data, and eventually make any updates to the user data. The web server typically stops and waits, and a web page desired by the user is presented to the user only if all the steps in the code are finished. While this technique provides data information accurately and in real-time, it has the disadvantage that the user may have to wait for a substantial amount of time for information to be presented. Thus, this technique is more suitable for processing data pages with simple processing logic that can be obtained rapidly.

2) Asynchronous scripts. A web server implementing this technique usually preferentially executes simple logic processing and data presentation, and concurrently executes more complex and time-consuming logic processing using scripts such as JavaScript and XML (AJAX) technology. The web page initially presents partial data and is updated after the more complex and time-consuming logic processing is finished to present the finalized data. Although this technique improves the user experience, the user still have to wait for a substantial amount of time before obtaining service data generated by the complex processing logic.

3) Periodic pre-construction of data. A web server adopting this technique typically completes in advance logic processing required for enabling each user to access the intended service page and stores the resultant data. Subsequently, when the user accesses the service page, the already constructed data is presented to the user. This technique significantly improves the user experience; however, user information is not updated in real time. In addition, data is constructed in advance for all users, which can result in excessive consumption of system resources. Particularly, whenever a new service is introduced, the complexity and consumed resources of the system is proportionally increased.

4) Buffering of data. A web server adopting this technique stores any data that requires complex and time consuming logic processing in a buffer. The data is valid for a certain amount of time. When a user accesses the system, data is read out from the buffer. If no data exists in the buffer, or if the buffered data has expired, updates are made using techniques such as 1) or 2). Similar to technique 3), data buffering also improves user experience, but may increase the amount of resources consumed, especially when new services are introduced.

BRIEF DESCRIPTION OF THE DRAWINGS

Various embodiments of the invention are disclosed in the following detailed description and the accompanying drawings.

DETAILED DESCRIPTION

Figure 1:
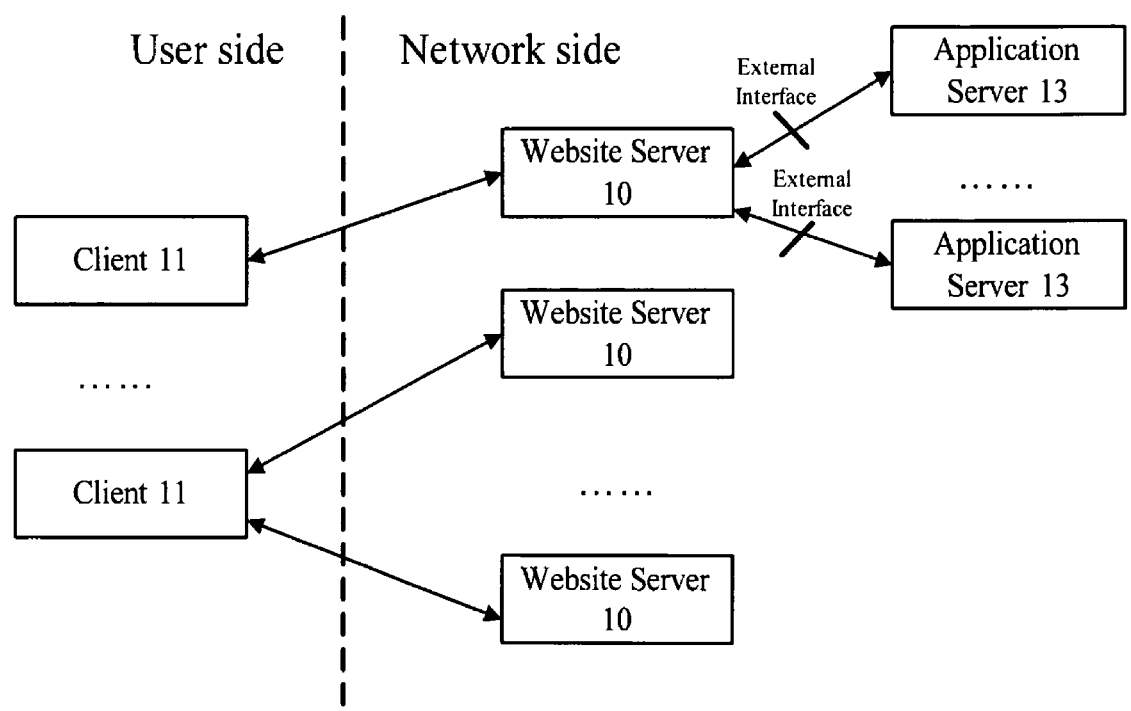
FIG. 1 is a block diagram illustrating an embodiment of a system that supports the improved data update technique.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A website data update technique with improved efficiency and reduced complexity is described. In some embodiments, after determining a local login of a client, a website server instructs the client to obtain and return user identification information of a user if an operation behavior of the user satisfies a first preset condition. The website server receives the user identification information returned by the client and parses the user identification information to obtain a user ID. The website server updates the designated service-related data when determining that the stored user property information corresponding to the user ID satisfies a second preset condition.

In some embodiments, to obtain the user identification information, the web server inserts a designated tag to a web page or inserts a designated identifier in a response message. The website server instructs the client to obtain and return the user identification information if an operation behavior of the user satisfies the first preset condition.

In some embodiments, instruction codes for detecting user behaviors are inserted into web pages to monitor the user behaviors. For example, the code of an IMG tag based on HTML may be provided as <img src=http://events.triger.company.com width='0' height='0'/>. The IMG tag may be deployed at any web page accessible to a user logging in to the system. Code including the IMG tag is executed concurrently with other HTML code. The IMG tag has no impact on the appearance of the web page containing the code because the width and height of the image are set to 0, therefore the user experience is not affected.

Preferred embodiments of the application are described below in detail with reference to the drawings.

FIG. 1 is a block diagram illustrating an embodiment of a system that supports the improved data update technique. In this example, system 100 includes a number of website servers 10, clients 11, and application servers 13. The actual number of each device may vary in different embodiments. The servers may be implemented as using one or more computing devices such as multiprocessor computers, large-scale computers, special purpose devices, distributed computing environments including any of the foregoing systems or devices, or other hardware/software/firmware combinations that include one or more processors, and memory coupled to the processors and configured to provide the processors with instructions. The client may be implemented using a personal computer, a handheld or portable device, a flat panel device, a multi-processor system, a microprocessor based system, a set-top box, a programmable consumer electronic device, a network PC, a minicomputer, or other hardware/software/firmware combinations that include one or more processors, and memory coupled to the processors and configured to provide the processors with instructions.

The application server 13 is adapted to offer the designated service and logically construct various service-related data of a user, such as identity information of a service designated by the user and operation data obtained from the processing instructed by the user.

The website server 10 is adapted to, after authenticating a user logged in from a client 11, instruct the client to obtain and return user identification information of the user attempting to login the website server if an operation behavior of the user satisfies a first preset condition. Upon receiving the user identification information returned by the client, the website server parses the user identification information to obtain a user ID and determines whether the stored user property information corresponding to the user ID satisfies a second preset condition. If so, the website server updates the designated service-related data. Details of the preset conditions are described below.

Figure 2:
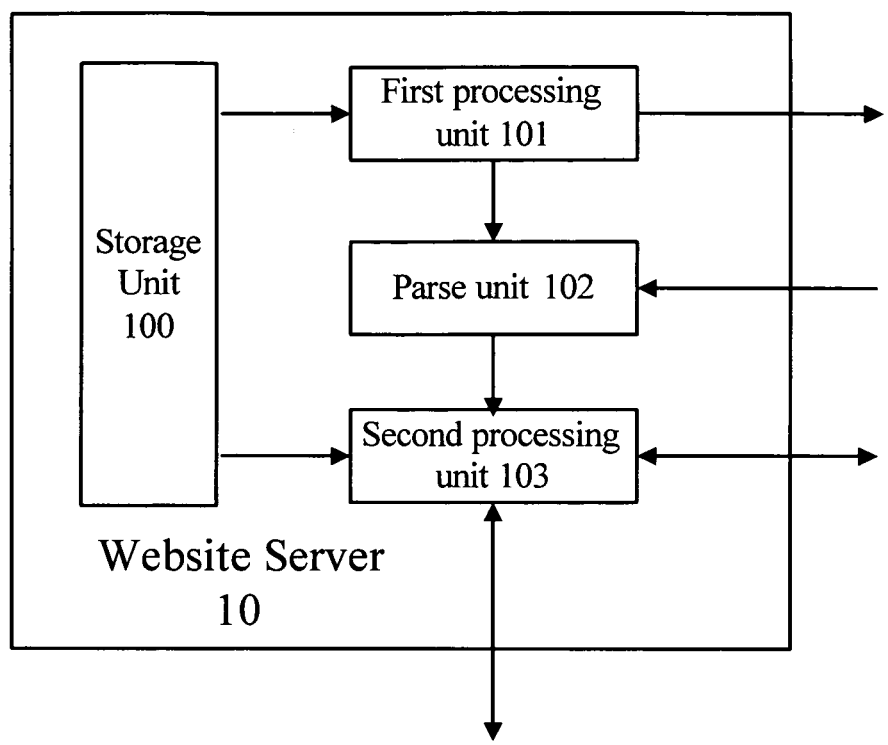
FIG. 2 is a block diagram illustrating an embodiment of a website server.

FIG. 2 is a block diagram illustrating an embodiment of a website server. In this example, website server 10 includes a storage unit 100, a first processing unit 101, a parse unit 102, and a second processing unit 103 in an embodiment of the application.

Storage unit 100 is adapted to store the first and second present conditions, and the user property information provided correspondingly for the user ID.

First processing unit 101 is adapted to, after authenticating a user logged in from a client 11, instruct the client to obtain and return user identification information of a user if an operation behavior of the user satisfies a first preset condition.

Parsing unit 102 is adapted to receive the user identification information returned by the client 11 and parse the user identification information to obtain a user ID.

Second processing unit 103 is adapted to update the designated service-related data when determining that the stored user property information corresponding to the user ID satisfies a second preset condition.

The units described above can be implemented as software components executing on one or more general purpose processors, as hardware such as programmable logic devices and/or Application Specific Integrated Circuits designed to perform certain functions or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipments, etc.) implement the methods described in the embodiments of the present invention. The units may be implemented on a single device or distributed across multiple devices. The functions of the units may be merged into one another or further split into multiple sub-units.

Figure 3:
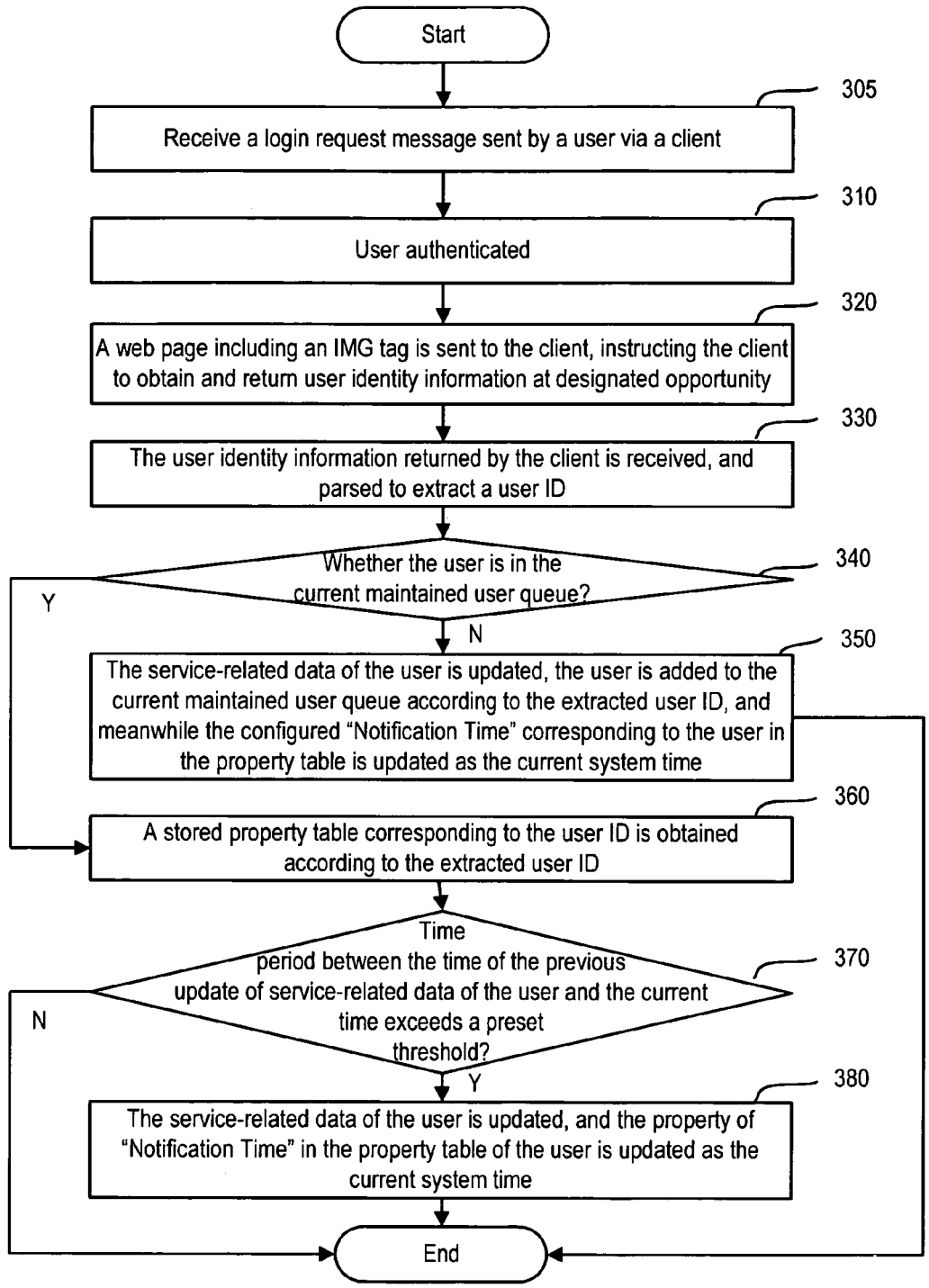
FIG. 3 is a flowchart illustrating an embodiment of a process for updating data.

FIG. 3 is a flowchart illustrating an embodiment of a process for updating data. In some embodiments, process 300 is performed on a website server such as website server 10 of FIG. 1.

At 305, a login request message sent by a user via a client is received. The login request message includes a user ID and login password.

At 310, the user is authenticated according to the obtained user ID and login password. In this example, it is assumed that the user is authenticated. After the website server acknowledges that the user has passed the authentication, the user is allowed to request and browse web pages as desired.

At 320, the web page requested by the user is sent to the client. In this example, each web page sent to the user includes an IMG tag for instructing the client to obtain and return user identification information at a designated condition. In some embodiments, the user identification information is embedded in a cookie by the user's browser and returned to the server.

In the present example, the code content of IMG tag is preset by an administrator at the network side. The website server can obtain in advance the IMG tag according to the content on each web page, insert the IMG tag to the code of the web page, and send a corresponding web page to the client when the web page is requested by the client. After receiving the web page containing the IMG tag, the client parses the code of the IMG tag, and based on the parsed code determines the designated condition indicated by the IMG tag to return the user identification information. Here, the designated condition occurs when the user's behavior of browsing the web page satisfies a preset condition. When the designated condition occurs, the client obtains its locally stored user identification information and sends the user identification information to the website server to trigger the subsequent processing flow at the network side.

Various preset conditions are configured in advance according to the application requirements. Many preset conditions are possible. For example, the preset condition may depend on the amount of time the user spends browsing a site. Specifically, the user identification information is obtained if the time taken by the user for browsing a web site exceeds a designated threshold. This condition allows the server to filter out users who are only browsing the web site casually and quickly and who do not show a deep interest in continuing browsing the current web page in the subsequent processing flow. Accordingly, more attention and resources are given to processing data for users who exhibit a higher degree of interest in the site, such that system resources are allocated appropriately.

In another example, the preset condition depends on user selection of content. Specifically, identity information of a user clicking on a particular web page element is obtained when the element is selected by the user. In this way, a server can selectively provide certain data only for those users of a certain service corresponding to the particular web page element (such as VIP users) instead of all users, so that the processing efficiency of the system is improved.

In another example, the preset condition corresponds to user registration. When a user initially registers with a website system, the identity information of the user is obtained.

At 330, the user identification information returned by the client is received and parsed to extract a user ID.

In some implementations, the user identification information is stored in a cookie, and therefore the extraction of the user ID generally involves parsing and identifying the cookie of the user. In this embodiment of the application, to reduce the impact of cookie parsing and processing on the overall system performance, cookie parsing and processing by the website server is limited to a specific time period to prevent degradation of the user experience. In some embodiments, the website server starts a timer for the current processing flow, and when the amount of time exceeds a preset threshold, the client indicates to the user that an error has occurred and provides a choice for the user to restart the processing flow or end the current processing flow.

In some embodiments, the website server maintains a group of queues for the registered users that are logged in. The queues are periodically updated to identify the registration status of the user and the time of the previous login of the user to the website, thereby facilitating the update of property tables of the users in the subsequent flow. If a user has not logged in for at least a predetermined amount of time, the user is removed from the queues.

At 340, it is determined whether the user is in a currently maintained user queue according to the extracted user ID; and if so, control is transferred to 360; otherwise, control is transferred to 350.

Additionally, in some embodiments, the website server maintains a property table for all registered users that are logged in. The property table includes user IDs and the time when notification is sent with respect to the users (details of the notification time are discussed below). For example, content of the property table may be as shown in Table 1 or 2 below.

TABLE 1

| User ID | Notification Time |
|---------|-------------------|
| ID A    | 9:00              |
| ID B    | 10:00             |
| ...     | ...               |

TABLE 2

| User ID | Notification Time |
|---------|-------------------|
| ID A    | 2 hours ahead of the current time |
| ID B    | 1 hour ahead of the current time |
| ...     | ...               |

At 350, the service-related data of the user is updated, the user is added to the currently maintained user queue according to the extracted user ID, and meanwhile the configured "Notification Time" corresponding to the user in the property table is updated as the current system time; subsequently, the flow is ended.

In some embodiments, if the user corresponding to the extracted user ID is not yet in the current maintained user queue, it means that the user is a newly registered user or that the time period between the time of the previous login of the user and the current time has exceeded the preset threshold. Accordingly, the user needs to be added to the user queue.

As used herein, a notification refers to an instruction to a corresponding application server (e.g., application server 13 of FIG. 1), requesting the application server to update the service-related data of the user, thus ensuring that the service information of the user is obtained from the web page in real time. In some embodiments, the service-related data is updated by calling the corresponding application server according to preset rules. The website server has the capability of calling an external interface for the purpose of, but not limited to: maintaining a call queue of the external interface, with properties of the external interface including the name, port number and employed communication protocol type of the called application server; enabling the proper calling of each external interface in the call queue when a notification message is received.

When updating the service-related data of the user, the application server re-calculates the service-related data of the user according to its service property. For example, if the application server has a service property of providing the user with contact information of the user, the application server re-calculates the contact information of the related user when a notification is received from the website server and presents the newly re-calculated contact information to the client via the website server.

In this way, during the operation of the system, a user specifies the desired service, and the website server (e.g., website server 10 of FIG. 1) instructs the corresponding application server to update the service-related data of the user. For a user whose operation behavior satisfies a certain preset condition, the website server immediately calls the corresponding external interface to obtain the latest service-related data of the user from the application server corresponding to the operation behavior of the user and organizes and presents the service-related data in the form of webpage information. Additionally, when a new service is added (that is, the system is extended with a new service running on a new application server), the website server adds an external interface corresponding to the new service to the locally maintained call queue according to rules defined in the system and subsequently instructs the corresponding application server by calling the external interface to complete logic construction of the service-related data of the user.

At 360, a stored property table corresponding to the user ID is obtained according to the extracted user ID.

In some embodiments, if the user corresponding to the extracted user ID already exists in the current user queue, the website server further obtains the property table of the user and extracts the property of "Notification Time" in the table for the subsequent processing.

At 370, according to the obtained property table, it is determined whether the time period between the time of the previous notification to the user and the current time exceeds the preset threshold; and if so, control is transferred to 380; otherwise, the current flow ends. If it is determined that the time period between the time of the previous notification to the user and the current time exceeds the preset threshold according to the property table of the user, the service information in the web page that the user is browsing has expired and requires updating to ensure that the service information is current in real time.

At 380, the service-related data of the user is updated and the property of "Notification Time" in the property table of the user is updated as the current system time.

In the above embodiments of the application, by maintaining the user queue and the property table of each user in the user queue, the website server can timely control the frequency of the service-related data update caused by actions of newly registered users and already registered users, so that the resource consumption and operation load of the entire system can be reduced and the system efficiency can be increased. Further, the deployment of the above technical solution does not cause significant impact to the existing system, so that smooth user experience is ensured and the subsequent maintenance is simplified.

Based on the above embodiments, the technical solution is described below in detail with reference to a practical application scenario.

Referring to FIG. 1, it is assumed that website server 10 supports such a system in which, after a user logs in a personal homepage, other users that may be of interest to this user (as friends, potential business contacts, etc.) are recommended by the system as contacts. Thus, the service-related information desired by the user is "recommended contact information". The user has a practical requirement that the recommended contact information is as new as possible, but does not have to be in real time.

In some cases, millions or more users may log in to website server 10 and a complete contact recommendation calculation can takes several minutes.

In the implementation of the prior art, the correlations between the user who just logged in and all other users are calculated and associated recommended contact information is presented to the user according to the calculation result. If there are a large number of users, the complete calculation of all the correlations typically takes a long time, while the calculated recommended information of a large population of users has little value (for example, the large part of users do not log in the website server frequently); thus, large amounts of system resources are wasted and the recommended contact information is not in real time due to a relatively long calculation period.

In contrast, with the technique described in this application, the website server determines whether to calculate the correlations between a currently logged in user and other users according to the operation behavior of the user and calculates the correlations if the operation behavior of the user satisfies a preset condition.

For example, the correlations between users are calculated only if the currently logged in user stays on the web page for a time period longer than a preset period, thereby avoiding triggering unnecessary correlation calculation for a currently logged in user who is only casually and quickly browsing the web page and avoiding wasting system resources. The complexity of data update flow is lowered and the efficiency of the system is improved.

In another example, the correlations are calculated if the currently logged in user conducts a particular operation on the web page, such as when the logged in user clicks on the button of "Service Support" to access support service information. Upon detecting the user action, the system computes and recommends contacts to the user. Alternatively, the website server can, based on the service content (such as a specific multimedia service) selected by the currently logged in user, calculate recommended contact information of users that are correlated with the logging user in terms of the multimedia service. Thus, the waste of system resources is further avoided, the system efficiency is improved, and the accuracy of the recommended contact information provided by the system is improved.

It will be appreciated that one skilled in the art may make various modifications and alterations to the embodiments of the application without departing from the spirit and scope of the present application. Accordingly, if these modifications and alterations to the embodiments of the application fall within the scope of the claims of the application and their equivalents, the application also intends to include all these modifications and alterations.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for updating user data on a website, comprising:
   authenticating a user who is accessing the website via a client;
   determining whether an operation behavior of the user satisfies a first preset condition, wherein the first preset condition is met when time spent by the user for browsing a web page exceeds a designated threshold;
   in the event that the first preset condition is satisfied, obtaining user identification information, including a user identifier (ID);
   determining whether a stored user property that corresponds to the user ID satisfies a second preset condition; and
   in the event that the second preset condition is satisfied, updating designated service related data of the user,
   wherein the second preset condition is satisfied when the stored user property corresponding to the user ID indicates a time period between the time of the previous update of service-related data of the user and the current time exceeds a preset threshold.

2. The method of claim 1, wherein obtaining the user identification information includes inserting a designated tag in a web page accessed by the user, and instructing the client to obtain and return user identification information.

3. The method of claim 1, wherein obtaining the user identification information includes inserting a designated identifier in a response message to the client, and instructing the client to obtain and return user identification information.

4. The method of claim 1, wherein the first preset condition is met when the user initially registers with the website.

5. The method of claim 1, wherein updating the designated service-related data of the user includes calling an application server corresponding to the operation behavior of the user via an external interface to obtain the service-related data of the user, and presenting the obtained service-related data to the user in the form of web page information.

6. The method of claim 1, wherein, the designated service-related data comprises recommended contact information.

7. A website server system, comprising:
   one or more processors configured to:
      authenticate a user who is accessing the website via a client;
      determine whether an operation behavior of the user satisfies a first preset condition, wherein the first preset condition is met when time spent by the user for browsing a web page exceeds a designated threshold;

in the event that the first preset condition is satisfied, obtain user identification information, including a user identifier (ID);

determine whether a stored user property that corresponds to the user ID satisfies a second preset condition; and in the event that the second preset condition is satisfied, update designated service related data of the user; and one or more memories coupled to the one or more processors, configured to provide the processors with instructions, wherein the second preset condition is satisfied when the stored user property corresponding to the user ID indicates a time period between the time of the previous update of service-related data of the user and the current time exceeds a preset threshold.

8. The system of claim 7, wherein obtaining the user identification information includes inserting a designated tag in a web page accessed by the user, and instructing the client to obtain and return user identification information.

9. The system of claim 7, wherein obtaining the user identification information includes inserting a designated identifier in a response message to the client, and instructing the client to obtain and return user identification information.

10. The system of claim 7, wherein the first preset condition is met when the user initially registers with the website.

11. The system of claim 7, wherein updating the designated service-related data of the user includes calling an application server corresponding to the operation behavior of the user via an external interface to obtain the service-related data of the user, and presenting the obtained service-related data to the user in the form of web page information.

12. The system of claim 7, wherein, the designated service-related data comprises recommended contact information.

13. The method of claim 1, wherein in the event that the second preset condition is satisfied, the time of the previous update of service-related data of the stored user property corresponding to the user is updated to the current time.

14. A method for updating user data on a website, comprising:

authenticating a user who is accessing the website via a client;

determining whether an operation behavior of the user satisfies a first preset condition, wherein the first preset condition is met when time spent by the user for browsing a web page exceeds a designated threshold;

in the event that the first preset condition is satisfied, obtaining user identification information, including a user identifier (ID);

determining whether a stored user property that corresponds to the user ID satisfies a second preset condition; and in the event that the second preset condition is satisfied, updating designated service related data of the user, and updating the stored user property corresponding to the user ID to include user identification information corresponding to the user ID, wherein the second preset condition is satisfied when the stored user property corresponding to the user ID is null.

15. A website server system, comprising:

one or more processors configured to:

authenticate a user who is accessing the website via a client;

determine whether an operation behavior of the user satisfies a first preset condition, wherein the first preset condition is met when time spent by the user for browsing a web page exceeds a designated threshold;

in the event that the first preset condition is satisfied, obtain user identification information, including a user identifier (ID);

determine whether a stored user property that corresponds to the user ID satisfies a second preset condition; and in the event that the second preset condition is satisfied, update designated service related data of the user, and update the stored user property corresponding to the user ID to include user identification information corresponding to the user ID; and one or more memories coupled to the one or more processors, configured to provide the processors with instructions, wherein the second preset condition is satisfied when the stored user property corresponding to the user ID is null.

* * * * *